(12) United States Patent
Ito et al.

(10) Patent No.: US 8,909,506 B2
(45) Date of Patent: Dec. 9, 2014

(54) PROGRAM, INFORMATION STORAGE MEDIUM, INFORMATION PROCESSING SYSTEM, AND INFORMATION PROCESSING METHOD FOR CONTROLLING A MOVEMENT OF AN OBJECT PLACED IN A VIRTUAL SPACE

(75) Inventors: Tomohito Ito, Kanagawa (JP); Chihiro Kanno, Kanagawa (JP); Hiroshi Matsuike, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 372 days.

(21) Appl. No.: 13/484,446

(22) Filed: May 31, 2012

(65) Prior Publication Data

US 2012/0310610 A1 Dec. 6, 2012

(30) Foreign Application Priority Data

May 31, 2011 (JP) .................................. 2011-122503
May 31, 2011 (JP) .................................. 2011-122504

(51) Int. Cl.
*A63F 13/10* (2006.01)
*G06T 13/20* (2011.01)
*A63F 13/40* (2014.01)

(52) U.S. Cl.
CPC ............ *A63F 13/10* (2013.01); *A63F 2300/64* (2013.01); *G06T 13/20* (2013.01); *A63F 2300/6054* (2013.01)
USPC ............................................................ 703/6

(58) Field of Classification Search
None
See application file for complete search history.

(56) References Cited

U.S. PATENT DOCUMENTS 6,195,625 B1 * 2/2001 Day et al. ........................... 703/7
6,791,549 B2 * 9/2004 Hubrecht et al. ............. 345/473
8,154,524 B2 * 4/2012 Wilson et al. ................. 345/173
(Continued)

FOREIGN PATENT DOCUMENTS

JP 2000-113225 4/2000
JP 2005-322057 11/2005
(Continued)

OTHER PUBLICATIONS

Millington, Ian "Game Physics Engine Development" (2007) available at <http://www.ulb.tu-darmstadt.de/tocs/209061758.pdf>.*

(Continued)

*Primary Examiner* — Kamini S Shah
*Assistant Examiner* — Jay B Hann
(74) *Attorney, Agent, or Firm* — Katten Muchin Rosenman LLP (57) ABSTRACT

An object placement managing unit changes at least one of a position and a direction of a virtual object based on a value of a parameter associated with a physical quantity that is an attribute of the virtual object. The object placement managing unit determines a first change, which corresponds to a user's operation, in a first physical quantity of the virtual object. The object placement managing unit determines a second change in a second physical quantity. The second change corresponds to and is different from the first change. The object placement managing unit changes a value of a parameter based on the first change and the second change. The object placement managing unit changes, after the value of the parameter is changed, at least one of the position and the direction of the virtual object based on the changed value of the parameter.

10 Claims, 4 Drawing Sheets

(56) References Cited

U.S. PATENT DOCUMENTS

| | | | |
|---|---|---|---|
| 8,279,227 B2 * | 10/2012 | Cohen | 345/473 |
| 8,353,769 B2 * | 1/2013 | Okamura | 345/473 |
| 2005/0075154 A1 * | 4/2005 | Bordes et al. | 463/1 |
| 2006/0149516 A1 * | 7/2006 | Bond et al. | 703/6 |
| 2010/0134501 A1 * | 6/2010 | Lowe et al. | 345/473 |
| 2012/0303343 A1 * | 11/2012 | Sugiyama et al. | 703/6 |
| 2012/0330628 A1 * | 12/2012 | McDaniel et al. | 703/2 |

FOREIGN PATENT DOCUMENTS

| | | |
|---|---|---|
| JP | 2007-207005 | 8/2007 |
| JP | 2008-165584 | 7/2008 |
| JP | 2009-195356 | 9/2009 |

OTHER PUBLICATIONS

Japanese Office Action dated Apr. 23, 2013, from corresponding Japanese Application No. 2011-122504.

* cited by examiner

PROGRAM, INFORMATION STORAGE MEDIUM, INFORMATION PROCESSING SYSTEM, AND INFORMATION PROCESSING METHOD FOR CONTROLLING A MOVEMENT OF AN OBJECT PLACED IN A VIRTUAL SPACE

CROSS-REFERENCE TO RELATED APPLICATIONS

The present application claims priority from Japanese applications JP2011-122503 and JP2011-122504, both filed on May 31, 2011, the contents of which are hereby incorporated by reference into this application.

BACKGROUND OF THE INVENTION

1. Field of the Invention

The present invention relates to a program, an information storage medium, an information processing system, and an information processing method.

2. Description of Related Art

There has been available an information processing system that sequentially generates frame images each showing a picture obtained by viewing an object placed in a virtual space from a viewpoint position defined in the virtual space in the viewing direction, and displays on a display device. There has also been available an image processing system that utilizes a physics engine, which is a software for simulating the laws of physics, such as the laws of classical mechanics, to improve reality in movement of an object placed in a virtual space.

Typically, the physics engine determines a position and an direction of an object after elapse of a predetermined period of time, based on a value of a parameter indicative of physical quantity (e.g., position, direction, mass, inertia moment, velocity, angular velocity) set for each object at a certain moment and a value of a parameter indicative of physical quantity (e.g., wind velocity) relating to the whole virtual space.

In addition, there has been known an information processing system capable of moving an object placed in the virtual space according to an amount of operation input by a user's operation of a controller, for example.

SUMMARY OF THE INVENTION

In a physical simulation processing by a physics engine, an object placed in a virtual space basically moves according to the laws of classical mechanics. However, for example, in a scene of a computer game where a character object moves while grasping a linear object such as a rope or chain, there is a case where, as an expression of a moving character object, it is rather desirable to move the object against the laws of physics, for example, by making the mass of the portion grasped by the character object heavier than that of other portions, or quickly stopping the swing of a linear object with respect to a direction that is different from the direction to which the character object is desired to be moved.

As explained above, in a scene where the processing (e.g., a physical simulation using a physics engine) is executed to change a position or direction of an object based on a value of a parameter associated with a physical quantity, which is an attribute of the object, a wide variety of expressions of moving objects are expected to be introduced by flexibly setting values of parameters without being concerned with faithful reproduction of the laws of physics.

The present invention have been conceived in view of the above, and an object of some embodiments of the present invention is to increase variations of expressions of moving objects placed in a virtual space.

In order to solve the above described problems, according to the embodiment of the present invention, there is provided a program stored in a non-transitory computer readable information storage medium, for causing a computer to function as an information processing system for controlling a movement of an object placed in a virtual space. The program includes object changing instructions to change at least one of a position and a direction of an object to be moved placed in the virtual space based on a value of a parameter associated with a physical quantity that is an attribute of the object to be moved, first change determination instructions to determine a first change in the physical quantity of the object to be moved, the first change corresponding to a user's operation, second change determination instructions to determine a second change in the physical quantity of the object to be moved, the second change corresponding to and different from the determined first change, and value changing instructions to change a value of the parameter based on the first change and the second change. The object changing instructions include instructions to change, after the value of the parameter is changed, at least one of the position and the direction of the object to be moved based on the changed value of the parameter.

According to the embodiment of the present invention, there is provided a non-transitory computer readable information storage medium storing a program for causing a computer to function as an information processing system for controlling a movement of an object placed in a virtual space. The program includes changing instructions to change at least one of a position and a direction of an object to be moved placed in the virtual space based on a value of a parameter associated with a physical quantity that is an attribute of the object to be moved, first change determination instructions to determine a first change in the physical quantity of the object to be moved, the first change corresponding to a user's operation, second change determination instructions to determine a second change in the physical quantity of the object to be moved, the second change corresponding to and different from the determined first change, and value changing instructions to change a value of the parameter based on the first change and the second change. The object changing instructions include instructions to change, after the value of the parameter is changed, at least one of the position and the direction of the object to be moved based on the changed value of the parameter.

According to the embodiment of the present invention, there is provided an information processing system for controlling movement of an object placed in a virtual space. The information processing system includes an object changing unit for changing at least one of a position and a direction of an object to be moved placed in the virtual space based on a value of a parameter associated with a physical quantity that is an attribute of the object to be moved, a first change determination unit for determining a first change in the physical quantity of the object to be moved, the first change corresponding to a user's operation, a second change determination unit for determining a second change in the physical quantity of the object to be moved, the second change corresponding to and different from the determined first change; and a value changing unit for changing a value of the parameter based on the first change and the second change. The object changing unit changes, after the value of the parameter is changed, at least one of the position and the direction of the object to be moved based on the changed value of the parameter.

According to the embodiment of the present invention, there is provided an information processing method for controlling movement of an object placed in a virtual space. The method includes changing at least one of a position and a direction of an object to be moved placed in the virtual space based on a value of a parameter associated with a physical quantity that is an attribute of the object to be moved, determining a first change in the physical quantity of the object to be moved, the first change corresponding to a user's operation, determining a second change in the physical quantity of the object to be moved, the second change corresponding to and different from the determined first change, changing a value of the parameter based on the first change and the second change, and changing, after the value of the parameter is changed, at least one of the position and the direction of the object to be moved based on the changed value of the parameter.

According to the embodiment of the present invention, in addition to a change in the physical quantity of the object to be moved in response to an operation received from an user, a change in a physical quantity that is associated with the change in the physical quantity in the predetermined correspondence rule data is also reflected in changes in at least one of the position and the direction of the object to be moved. Accordingly, a wider variety of expressions of moving object placed in the virtual space can be achieved.

According to one aspect of the present invention, the first change determination instructions include instructions to determine a change in at least one of a velocity and an angular velocity of the object to be moved with respect to a specific direction, and the second change determination instructions include instructions to determine a change in at least one of a velocity and an angular velocity of the object to be moved with respect to a direction different from the specific direction.

According to one aspect of the present invention, under a condition that the first change determination instructions include instructions to determine increasing at least one of the velocity and the angular velocity of the object to be moved with respect to the specific direction, the second change determination instructions include instructions to determine decreasing at least one of the velocity and the angular velocity of the object to be moved with respect to the direction different from the specific direction.

According to one aspect of the present invention, the first change determination instructions include instructions to determine changing a force applied to at least one of a plurality of elements included in the object to be moved, and the second change determination instructions include instructions to determine changing a mass or a moment of inertia of at least one of the elements.

According to one aspect of the present invention, the second change determination instructions include instructions to determine increasing at least one of the mass and the moment of inertia of at least one of the elements in which the change in the force is determined, and decreasing at least one of the mass and the moment of inertia of at least one of the rest of the elements.

According to one aspect of the present invention, the second change determination instructions include instructions to determine increasing at least one of the mass and the moment of inertia of at least one of the elements in which the change in the force is determined, and decrease at least one of the mass and the moment of inertia of all of the rest of the elements.

According to one aspect of the present invention, the object changing instructions include instructions to change at least one of the position and the direction of the object to be moved based on values of a plurality of parameters, each of the parameters being associated with at least one of a mass and a moment of inertia of each element, and the value changing instructions include instructions to change a value of a parameter associated with at least one of a mass and a moment of inertia of an element in which an increase or a decrease in at least one of the mass and the moment of inertia is determined.

According to one aspect of the present invention, the program further includes instructions to generate an image representing the virtual space, in which the object is placed, viewed from a viewpoint defined in the virtual space.

DETAILED DESCRIPTION OF THE INVENTION

An embodiment of the present invention will be described below in detail with reference to the accompanying drawings.

Figure 1:
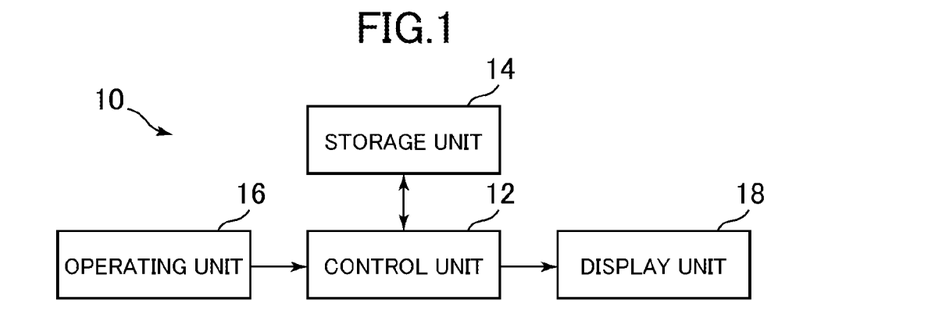
FIG. 1 is a diagram illustrating a configuration of a game device according to an embodiment of the present invention.

FIG. 1 is a diagram showing a structure of a game device 10 that functions as an information processing system according to an embodiment of the present invention. The game device 10 according to this embodiment is, for example, a game console, a portable game terminal, or a personal computer. As shown in FIG. 1, the game device 10 according to this embodiment includes a control unit 12, a storage unit 14, an operating unit 16, and a display unit 18.

The control unit 12 is a program control device, such as a central processing unit (CPU), that operates according to a program installed in the game device 10. The storage unit 14 is a memory element such as a read-only memory (ROM) or a random access memory (RAM), or a hard disk drive. The operating unit 16 is a keyboard, a mouse, or a controller of a video game console, or the like, and upon receipt of input of a user operation, outputs a signal indicating the content of the user operation to the control unit 12. The display unit 18 is a display device, such as a liquid crystal display, and displays a variety of images according to an instruction from the control unit 12.

Note that the game device 10 may include a communication interface, such as a network board, an optical disc drive for reading an optical disc, such as a digital video disc ROM (DVD-ROM) or a Blu-ray (registered trademark) disc, and a USB (Universal Serial Bus) port.

Figure 2:
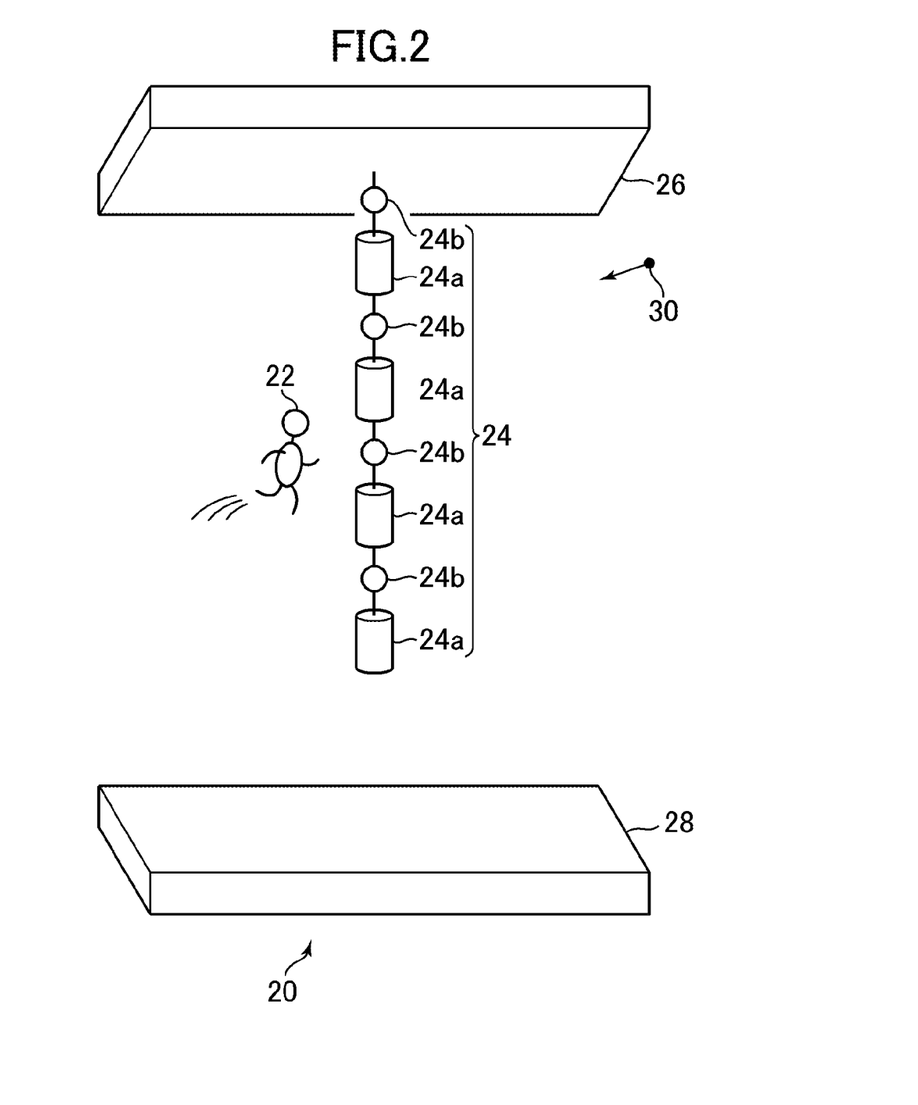
FIG. 2 is a diagram illustrating an example of a virtual space constructed by the game device according to an embodiment of the present invention.

The game device 10 according to this embodiment executes a program to which the present invention is applied to thereby generate a virtual space 20 shown as an example in FIG. 2 in the memory. As shown, the virtual space 20 according to this embodiment is a virtual 3D space where virtual objects, such as a player object 22, a chain object 24, a ceiling object 26, and a floor object 28, are placed, as well as a viewpoint 30.

In this embodiment, a virtual object includes a plurality of polygons, each having a texture mapped thereon. In this embodiment, a user of the game device 10 can operate the operating unit 16 to thereby move the player object 22 in the virtual space 20.

In the program executed in the game device 10 according to this embodiment, the function of a physics engine for simulating the laws of physics, such as the laws of classical mechanics, is implemented.

In this embodiment, for example, a user can operate the operation unit 16 to make the player object 22 perform some actions, such as grasping the chain object 24, moving away from the chain object 24, swinging the chain object 24, and rotating the chain object 24.

Figure 3:
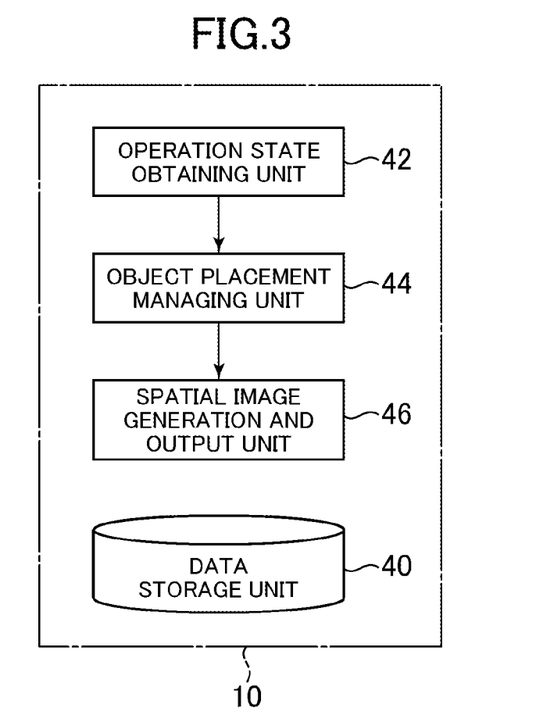
FIG. 3 is a functional block diagram illustrating an example of functions to be implemented on the game device according to an embodiment of the present invention.

FIG. 3 is a functional block diagram of the game device 10 according to this embodiment. As shown in FIG. 3, the game device 10 functionally comprises a data storage unit 40, an operation state obtaining unit 42, an object placement managing unit 44, and a spatial image generation and output unit 46. The data storage unit 40 is implemented mainly using the storage unit 14, while the other components are implemented mainly using the control unit 12.

These functions are achieved by executing a program according to this embodiment in the game device 10, or an information processing system. This program may be downloaded from another computer via a communication interface through a computer communication network or stored in a computer readable information storage medium, such as an optical disc (e.g., a compact disc ROM (CD-ROM) or a DVD-ROM) or a USB memory, to be installed therefrom into the game device 10 via an optical disc drive, a USB (Universal Serial Bus) port, or the like.

In this embodiment, various data necessary for producing the virtual space 20 is stored in advance in the data storage unit 40. In the data storage unit 40, polygon data, texture data, and so forth, relating to a virtual object placed in the virtual space 20, are stored. For example, as shown in FIG. 2, the chain object 24 includes a plurality of rigid objects 24a and joints 24b for connecting the rigid objects 24a together and connecting the rigid object 24a and the ceiling object 26. Note that in this embodiment, the rigid object 24a has a cylinder shape. In addition, in this embodiment, one end of the chain object 24 is a fixed end connecting to the ceiling object 26, and the other end is a free end.

In this embodiment, the data storage unit 40 stores a value of a parameter indicative of physical quantities of each rigid object 24a, such as size, mass, moment of inertia (inertia tensor in this embodiment), velocity, angular velocity, maximum velocity, maximum angular velocity, and impulse value (value indicating impulse). Further, in this embodiment, the same value of a mass parameter is set to respective rigid objects 24a in advance, and the same value of a moment-of-inertia parameter is also set to respective rigid objects 24a. These values are changeable according to the progress of the game.

In this embodiment, the data storage unit 40 also stores, for each joint 24b, constraint conditions to be satisfied in the physical simulation processing, with regard to a positional relationship between the rigid objects 24a connected to the joint 24b, and a positional relationship between the ceiling object 26 and the rigid objects 24a connected to the joint 24b. The constraint conditions include, for example, the maximum angle of rotation around the axis, and the maximum angle formed by each axis of the rigid objects 24a. In this embodiment, the physical simulation processing is executed so as to satisfy the constraint conditions.

Further, in this embodiment, the data storage unit 40 also stores control necessity information, which is a flag to indicate whether or not each rigid object 24a is an object of the physical simulation processing. In addition, in this embodiment, the data storage unit 40 stores correspondence rule data indicative of a correspondence rule between a first physical quantity related to a virtual object and a second physical quantity, which is changeable according to the change in the first physical quantity under the condition that the first physical quantity is changed. In this embodiment, the correspondence rule data also includes data indicating whether the second physical quantity is to be changed in preprocessing described later or in postprocessing described later. Note that how the control necessity information or the correspondence rule data are used in the processing will be discussed below.

In this embodiment, the spatial image generation and output unit 46 generates an image showing a picture obtained by viewing from the viewpoint 32 set in the virtual space 20 in the viewing direction (hereinafter referred to as a spatial frame image) at a predetermined interval (e.g., 1/60th of a second), and displays on the display unit 18.

Figure 4:
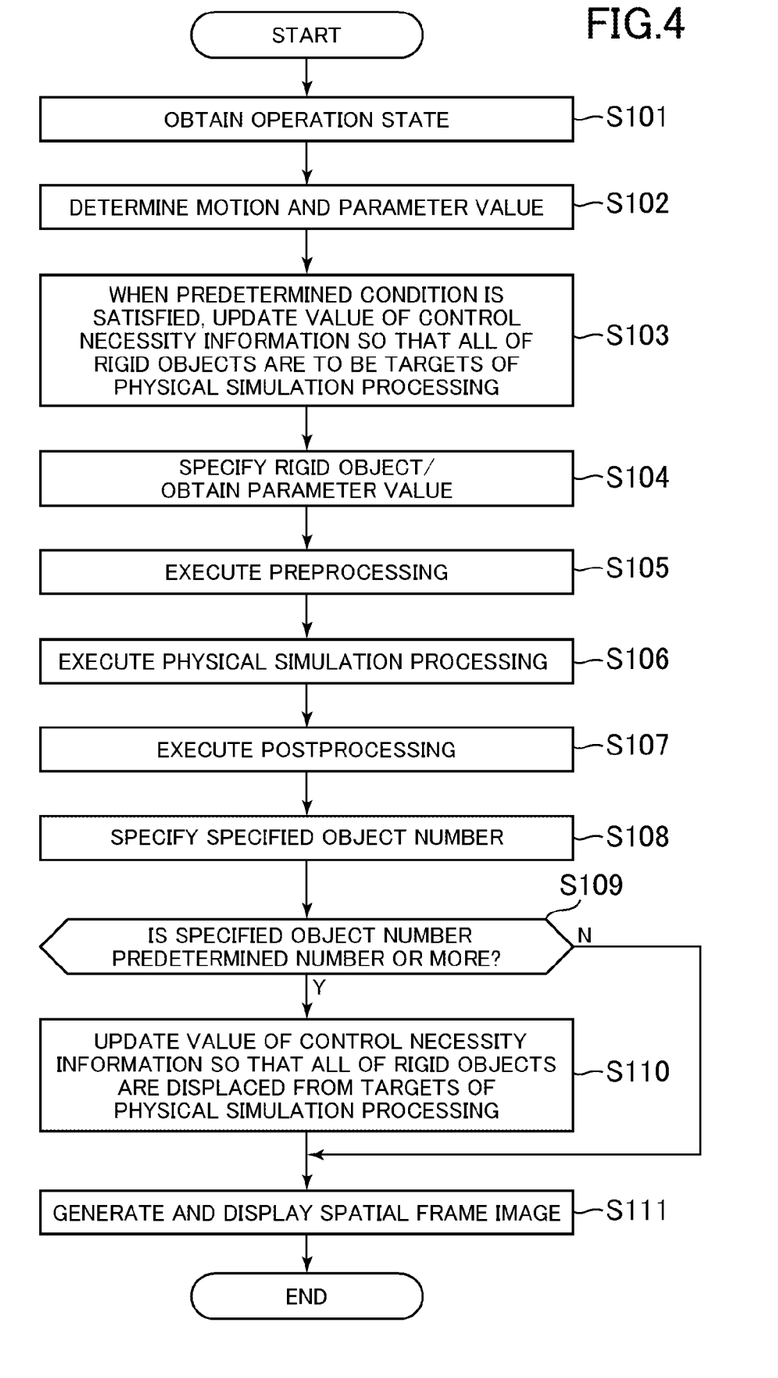
FIG. 4 is a flow chart illustrating an example of processing to be executed for each frame on the game device according to an embodiment of the present invention.

Below, an example of a flow of processing executed for every frame (e.g., at an interval of 1/60th of a second) in the game device 10 in this embodiment will be described referring to the flowchart illustrated in FIG. 4.

In this example of the processing, the data storage unit 40 stores the correspondence rule data in which an increase in forces on a rigid object 24a is set as a first physical quantity, and an increase in mass of such a rigid object 24a and a decrease in mass of all the other rigid objects 24a included in the chain object 24 are set as a second physical quantity. In addition, the correspondence rule data sets the change in mass with respect to an increase of force per unit. The correspondence rule data also indicates that the change in the mass of the rigid object 24a is performed in the preprocessing.

Further, in this example of the processing, the data storage unit 40 also stores the correspondence rule data in which, for example, an increase in velocity of the chain object 24 with respect to a specific direction is set as the first physical quantity, and a decrease in velocity of the chain object 24 with respect to the directions other than the specific direction mentioned above is set as the second physical quantity. In the correspondence rule data, a damping coefficient (decreasing rate 0 or more and less than 1) at the time when the velocity is decreasing as mentioned above is also set. The correspondence rule data also indicates that decreasing the velocity is performed in the postprocessing.

First, the operation state obtaining unit 42 obtains an operation state of the operation unit 16. The operation state includes, for example, a kind of button that is pressed, and how much the button is pressed (S101). Then, the object placement managing unit 44 determines, based on the obtained operation state, a motion of the player object 22 and a value of a parameter related to the motion (S102). Here, for example, a motion of the player object 22 to grasp one of the rigid objects 24a is determined. In addition, a value of a force parameter indicative of a force added to the rigid object 24a by the grasping motion is also determined.

When none of the rigid objects 24a are objects of the physical simulation processing, if the predetermined conditions are satisfied, the object placement managing unit 44 updates a value of the control necessity information so that all of the rigid objects 24*a* are to be objects of the physical simulation processing (S103). For example, under the condition that a distance between one of the rigid objects 24*a* and the player object 22 is equal to or less than a predetermined distance, or the player object 22 grasps one of the rigid objects 24*a*, the object placement managing unit 44 updates a value of the control necessity information so that all of the rigid objects 24*a* are to be objects of the physical simulation processing.

Subsequently, the object placement managing unit 44 obtains the control necessity information stored in the data storage unit 40 so as to specify the rigid object 24*a* to be an object of the physical simulation processing, and obtains a value of a parameter indicative of a physical quantity set in the specified rigid object 24*a* to be the object of the physical simulation processing (S104). In this example, the object placement managing unit 44 obtains, for example, values of a velocity parameter and an angular velocity parameter, and in addition, a value indicative of a position and direction of each rigid object 24, each of the values being set for each rigid object 24*a*. In this embodiment, a value of the velocity parameter is represented by a three-dimensional vector. The object placement managing unit 44 then executes the preprocessing for performing the physical simulation processing, based on the motion determined in the processing shown in S102, and the value of the parameter relating to the determined motion, and the correspondence rule data indicating that the second physical quantity is to be changed in the preprocessing (S105). In a frame where the motion of the player object 22 to grasp one of the rigid objects 24*a* has occurred, for example, the object placement managing unit 44 increases a value of the mass parameter set in the rigid object 24*a* grasped by the player object 22, and decreases values of the mass parameters set in all of the other rigid objects 24*a* contained in the chain object 24. Here, based on the correspondence rule data, increase and decrease in values of the mass parameter are determined according to the values of the force parameter that represents a force added to the rigid object 24*a* when the player object 22 grasps the rigid object 24*a*.

Subsequently, based on the value of the parameter set in each rigid object 24*a* and the value of the force parameter determined in the processing shown in S102 mentioned above, the object placement managing unit 44 executes the physical simulation processing so as to change a position or direction of each rigid object 24*a* and the value of the parameter set in each rigid object 24*a* (S106).

In this embodiment, the physical simulation processing shown in S106 is executed using functions of a known physics engine. In the known physics engine, for example, a value of a mass parameter, a value of a moment-of-inertia parameter, a value of a velocity parameter, a value of an angular velocity parameter, respectively being set for each rigid object 24*a*, a position and direction of each rigid object 24*a*, a value of a force parameter determined in the processing shown in S102 mentioned above, and constraint conditions by the joint 24*b* are input so as to output a value of velocity parameter and a value of angular velocity parameter for each rigid object 24*a*, and a position and direction of each rigid object 24*a*, which are the results of the physical simulation.

Like the chain object 24 according to this embodiment, in a case where the rigid objects 24*a* are connected by the joints 24*b* in which the constraint conditions are set, processing for determining a temporary position, temporary direction, and temporary value of the velocity parameter, and temporary value of an angular velocity parameter, is sequentially performed for every rigid object 24*a*, thereby increasing accuracy of the physical simulation. However, the processing that can be performed within a time corresponding to one frame is limited. Thus, in this embodiment, after the processing for every rigid object 24*a* as described above is repeatedly performed predetermined times, the processing is ceased. Then, at that point, the temporary value of velocity parameter, temporary angular velocity parameter, and temporary direction are respectively determined as the final value of the velocity parameter, the final value of the angular velocity parameter, and the final direction. In addition, starting from the rigid object 24*a* placed at the fixed end, a position of each of the rigid objects 24*a* is determined in order so as to adjust a distance between the adjacent rigid objects 24*a* to be a predetermined distance.

Figure 5:
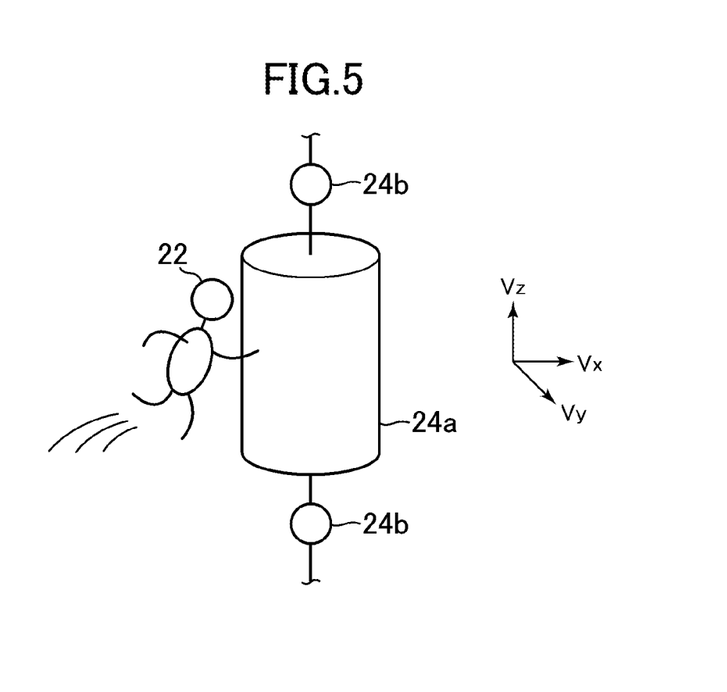
FIG. 5 is a diagram illustrating an example of a player object grasping a rigid object.

Subsequently, in response to the result of the physical simulation processing shown in S106, the object placement managing unit 44 performs the postprocessing to additionally change the value of the parameter set in each rigid object 24*a* (S107). For example, as illustrated in FIG. 5, under the condition that the player object 22 applies a force in the direction of an X-axis (i.e., the player object 22 moves to the X-axis positive direction), and a velocity Vx of the chain object 24 in the X-axis direction is increased, the object placement managing unit 44 multiplies a value Vy of the velocity parameter with respect to the Y-axis direction, which is perpendicular to the X-axis direction, and multiplies a value Vz of the velocity parameter with respect to the Z-axis direction, which is also perpendicular to the X-axis direction, by a damping coefficient set in the correspondence rule data.

The object placement managing unit 44 then specifies the number of the rigid object 24*a* having an absolute value of a value of the set velocity parameter that is equal to or less than a predetermined threshold value (cut-off threshold value velocity) and an absolute value of a value of the set angular velocity parameter that is equal to or less than a predetermined threshold value (cut-off threshold value angular velocity) (S108). In the following, the number of the rigid object 24*a* specified as mentioned above is referred to as a specified object number.

The object placement managing unit 44 determines whether or not the specified object number continues to be the predetermined number (for example, three) or more during the period of predetermined number or more of frames (for example, three) (S109). If so (S109:Y), the value of the control necessity information is updated so that none of the rigid objects 24*a* included in the chain object 24 is to be the object of the physical simulation processing (S110).

Otherwise (S109:N), or after the completion of the processing shown in S110, the spatial image generation and output unit 46 generates a spatial frame image, which shows a scene viewed from the viewpoint 30 to the viewing direction, outputs the image on the screen of the display unit 18 (S111), and completes the processing shown in this example.

In this embodiment, while the player object 22 grasps and swings the chain object 24, the value of the mass parameter of the grasped rigid object 24*a* continues to be greater than the values of the mass parameters of other rigid objects 24*a*. For example, under the condition that the player object 22 releases the chain object 24 in response to the user's operation, the player object 22 is separated from the chain object 24 and thrown. At this time, the object placement managing unit 44 returns the value of the mass parameter of each rigid object 24*a* to the predetermined initial value. In other words, the same value is set to the mass parameter of respective rigid objects 24*a*.

Further, during the period after the player object 22 releases the chain object 24 and before the whole chain object 24 is displaced from the objects of the physical simulation processing, the object placement managing unit 44 multiplies all of the rigid objects 24a included in the chain object 24 by the damping coefficient (0 or more and less than 1) with respect to the scene when the player object 22 separates from the chain object 24. In this embodiment, the value of the damping coefficient is set in advance and stored in the data storage unit 40. Note that the damping coefficient may be set differently among the direction (for example, X-axis direction) that the player object 22 is going to move towards and other directions (for example, Y-axis direction and Z-axis direction). For example, the value of the damping coefficient in the X-axis direction may be set smaller than the value of the damping coefficient in the Y-axis direction and the value of the damping coefficient in the Z-axis direction. This way, in this embodiment, it is possible to quickly stop the swing of the chain object 24 after the player object 22 separates from the chain object 24.

In this embodiment, for example, in the processing shown in S105, the value of the mass parameter set to the rigid object 24a grasped by the player object 22 is increased and the values of the mass parameters set to the other rigid objects 24a are decreased, thereby resulting in a condition where the chain object 24 swings more easily compared to the case where the value of the mass parameter of respective rigid objects 24a is set to the same value. As explained, changing the value of the mass parameter as indicated in the processing of S105 makes it possible to provide an image representation more suitable for games than the image representation in which the laws of physics are precisely reproduced by the physics engine.

In this embodiment, for example, in the processing shown in S107, in a case where the object placement managing unit 44 multiplies the value of the velocity parameter in the Y-axis direction and the Z-axis direction by the damping coefficient set to the correspondence rule data, it is possible to quickly stop the swing of the chain object 24 with respect to the directions other than the X-axis direction that the player object 22 is going to move towards, compared to a case where the processing is not executed as mentioned above. Further, under the condition that the player object 22 changes the direction of movement while grasping the chain object 24, it is possible to prevent the circular motion of the chain object 24 and provide the image to represent the chain object 24 swinging along the direction that the player object 22 is going to move towards.

As explained above, in this embodiment, in addition to a change in the physical quantity of the rigid object 24a in response to the operation received from the user, a change in the physical quantity of the rigid object 24a that is associated with the change in the physical quantity in the correspondence rule data is also reflected in changes in the position or direction of the rigid object 24a. Accordingly, a wider variety of expressions of moving rigid object 24a can be achieved, compared to the case where the laws of physics are simply reproduced by the physics engine precisely while the functions of the physics engine are utilized.

In this embodiment, in a given frame, the number of the rigid objects 24a having the set velocity parameter value, the absolute value of which is equal to or less than the predetermined threshold value (cut-off threshold value velocity), and the set angular velocity parameter value, the absolute value of which is equal to or less than the predetermined threshold value (cut-off threshold value angular velocity), is specified as the specified object number. Under the condition that the specified object number continues to be the predetermined number or more during the predetermined number of the frames (in this embodiment, for example, under the condition that the specified object number is continuously determined as the predetermined number or more for three times or more), all of the chain objects 24 are displaced from the objects of the physical simulation processing. This way, in this embodiment, the situation can be avoided where, while some of the rigid objects 24a are displaced from the objects of the physical simulation processing, the rest of the rigid objects 24a are the objects of the physical simulation processing. As a result, in this embodiment, the possibility of the chain object 24 moving unnaturally (for example, unnatural swing motions of the chain object 24) can be reduced. In addition, the number of the virtual objects that are the objects of the physical simulation processing can be reduced faster than in the case where the processing is not executed as mentioned above, and accordingly, the load of the physical simulation processing can be reduced. As a result, it is possible to prevent information processing load of the game device 10 from being increased.

The present invention is not to be limited to the above described embodiment.

Figure 6:
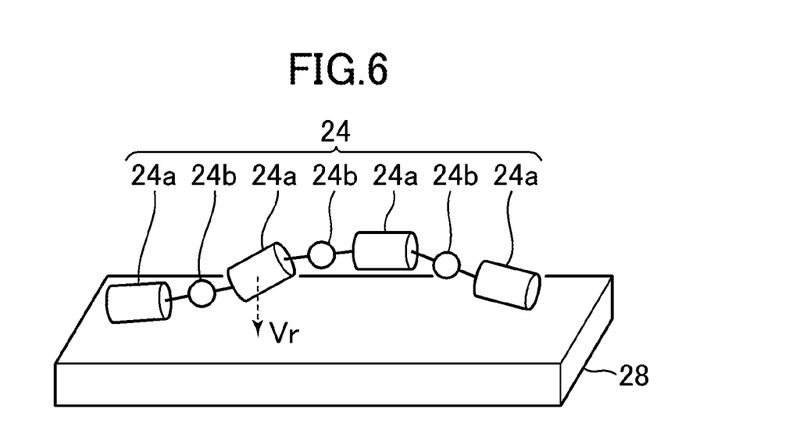
FIG. 6 is a diagram illustrating an example of a chain object lying and bouncing on a floor object.

For example, in a processing similar to the above mentioned processing, the chain objects 24 lying and bouncing on a floor object 28 as shown in FIG. 6 may be expressed. Here, the floor object 28 is static, and is set to keep its position and direction unchanged even though the chain object 24 collides therewith. Further, the value of a coefficient-of-reflection (COR) parameter, which represents a COR in a relationship between the rigid object 24a and the floor object 28, is set at the rigid object 24a, and is input into the physics engine in the physical simulation processing.

For example, in FIG. 6, under the condition that the absolute value of the relative velocity Vr of the rigid object 24a with respect to the floor object 28 when the rigid object 24a placed on the second from the left collides with the floor object 28 is equal to or less than a predetermined second threshold value, the object placement managing unit 44 may multiply the value of the COR parameter by the damping coefficient (0 or more and less than 1), which is set in advance with respect to the COR and stored in the data storage unit 40. In this respect, the relative velocity Vr matches the value of the velocity parameter of the rigid object 24a, since the floor object 28 is static in this embodiment. Further, the predetermined second threshold value mentioned above is greater than the threshold value in the processing of S108 mentioned above, which is referred to as a first threshold value in the following. This way, with respect to this rigid object 24a, the absolute value of the velocity parameter and the changes in position or direction per unit of time when the rigid object 24a moves away from the floor object 28 are relatively small compared to a case where the value of the COR parameter is not updated. With this, the situation can be avoided where the rigid object 24a never come to a stop over the floor object 28 due to the effect of rounding errors. In addition, the absolute value of the relative velocity with respect to the floor object 28 becomes equal to or less than the first threshold value, and thus the floor object 28 is displaced from the object of the physical simulation processing faster than a case where the value of the COR parameter is not updated. This way, the number of the virtual objects that are the objects of the physical simulation processing can be reduced faster than the case where the value of the COR parameter is not updated, and thus the load of the physical simulation processing can be reduced.

In this case too, under the condition that the specified object number continues to be the predetermined number (for example, 3) or more during the predetermined number of the frames (for example, 3 frames) or more, the object placement managing unit 44 may displace all of the rigid objects 24a included in the chain object 24 from the objects of the physical simulation processing.

The present invention is also not to be limited to the above described embodiment.

For example, in the processing shown in S107, the object placement managing unit 44 may change the value of the parameter which has the value that has been changed in the processing shown in S106 (for example, velocity Vx in the X-axis direction).

Further, for example, in the processing shown in S108, the object placement managing unit 44 may specify, as the specified object number, the number of the rigid object 24a having the set velocity parameter value, the absolute value of which is continuously equal to or less than the cut-off threshold value velocity during the predetermined number of the frames (for example, 2 frames) or more, and the set angular velocity parameter value, the absolute value of which is equal to or less than the cut-off threshold value angular velocity.

Further, in the processing shown in S108, it is possible to have an arrangement where the object placement managing unit 44 does not specify, as the specified object number, the number of the rigid object 24a having the set velocity parameter value, the absolute value of which is equal to or less than the cut-off threshold value velocity, and the set angular velocity parameter value, the absolute value of which is equal to or less than the cut-off threshold value angular velocity, but instead specifies, as the specified object number, the number of the rigid object 24a having the set velocity parameter value, the absolute value of which is equal to or less than the cut-off threshold value velocity, or specifies, as the specified object number, the number of the rigid object 24a having the set angular velocity parameter value, the absolute value of which is equal to or less than the cut-off threshold value angular velocity. Here, the game device 10 does not need to control whether to displace all of the rigid objects 24a from the objects of the physical simulation in response to results of the comparison between the specified object number and the predetermined value. For example, the game device 10 may control whether to displace all of the rigid objects 24a from the objects of the physical simulation based on whether or not a difference between the maximum value and the minimum value of the parameter value set at each rigid object 24a is equal to or less than the predetermined value.

Further, for example, in the processing shown in S109 and S110, whether to update the value of the control necessity information so that all of the rigid objects 24a included in the chain object 24 are displaced from the objects of the physical simulation processing may be controlled using the proportion of the number of the rigid objects 24a that continue to be specified for the predetermined number of frames or more as mentioned above in the number of the rigid objects 24a included in the chain object 24, for example, 50%, instead of using the number of the rigid object 24a that continues to be specified for the predetermined number of frames or more as mentioned above.

Further, for example, the data storage unit 40 may store the correspondence rule data in which the increase of the angular velocity with respect to the specific rotational direction of the chain object 24 is set as a first physical quantity, and the decrease of the angular velocity with respect to other rotational directions of the chain object 24 is set as a second physical quantity. In this correspondence rule data, for example, the damping coefficient (0 or more and less than 1) at the time of decrease of the angular velocity mentioned above is also set. It is also indicated in the correspondence rule data that decreasing the angular velocity of the rigid object 24a is performed in the postprocessing. For example, in the processing shown in S107, the object placement managing unit 44 may multiply the value of the angular velocity parameter with respect to the direction of movement of the player object 22 or the rotational direction, rather than the direction towards which the player object 22 rotates the chain object 24, by the damping coefficient set in the correspondence rule data. This way, with respect to the rotational direction, rather than the direction towards which the player object 22 rotates the chain object 24, the rotation of the chain object 24 can be stopped quickly.

Further, for example, both of increase or decrease of the velocity and increase or decrease of the angular velocity may be indicated in the correspondence rule data as the first physical quantity. For example, as the second physical quantity, both of increase or decrease of the velocity and increase or decrease of the angular velocity may be indicated. Then, in the processing shown in S107, both of the velocity and the angular velocity may be changed.

Further, for example, an increase in mass of a certain rigid object 24a and a decrease in mass of some of the rigid objects 24a other than the certain rigid object 24a (for example, two objects, one in front of and one next to the certain rigid object) included in the chain object 24 may be set in the correspondence rule data. The object placement managing unit 44 may decrease the value of the mass parameter of two rigid objects 24a placed in front of and next to the rigid object 24a grasped by the player object 22 in the processing shown in S105.

Further, for example, the data storage unit 40 may store the correspondence rule data in which an increase in the torque on a rigid object 24a is set as the first physical quantity, and an increase in the moment of inertia of that rigid object 24a and a decrease in the moment of inertia of other rigid objects 24a are set as the second physical quantity. The object placement managing unit 44 may change the moment-of-inertia parameter set in each rigid object 24a based on the determined value of the torque parameter and the correspondence rule data in which a relationship between the increased amount of the torque and the amount of changes in the moment of inertia is indicated. The object placement managing unit 44 may change a position and direction of each rigid object 24a and values of various parameters set in each rigid object 24a by inputting the value of the torque parameter in the physics engine.

Further, for example, in the above mentioned embodiment, the processing performed in the preprocessing may be performed in the postprocessing, or the processing performed in the postprocessing may be performed in the preprocessing. In particular, for example, in a frame where the player object 22 has grasped one of the rigid objects 24a, an increase and decrease of the mass parameter may be performed in the postprocessing, and the increase and decrease of the mass parameter may be reflected in the physical simulation processing of next and subsequent frames.

Further, for example, the value of the mass parameter may be changed according to the changes in the velocity of the rigid object 24a. In addition, for example, changes in the physical quantity (e.g., velocity of wind) relating to the entire virtual space 20 may be set as the second physical quantity indicated in the correspondence rule data.

It is noted that this embodiment may be applied to information processing systems (e.g., simulation system or image processing system) other than the game device 10. In the above, the invention is described in particular values and strings, but these values and strings, and values and strings in the accompanying drawings, are exemplary descriptions, and the invention is not limited to these particular values and strings.

Further, according the one embodiment of the present invention, there is provided a program stored in a non-transitory computer readable information storage medium, for causing a computer to function as an information processing system for controlling a movement of an object placed in a virtual space. The program may include: control necessity information obtaining instructions to obtain control necessity information from a control necessity information storage unit which stores control necessity information indicative of whether or not the movement of each of a plurality of objects placed in the virtual space is controlled, object changing instructions to change, for each of the objects which are indicated in the control necessity information that the movement of which is controlled, at least one of the position and the direction of the object by an amount that is calculated based on the value of at least one of the parameters indicating physical quantity which is an attribute of the object, and control necessity information update instructions to update control necessity information to indicate that movements of all of the plurality of objects are not controlled under the condition that a value of the parameter set to each object satisfies predetermined conditions.

According to the embodiment of the present invention, there is provided a non-transitory computer readable information storage medium storing a program for causing a computer to function as an information processing system for controlling a movement of an object placed in a virtual space. The program may include: control necessity information obtaining instructions to obtain control necessity information from a control necessity information storage unit which stores control necessity information indicative of whether or not the movement of each of a plurality of objects placed in the virtual space is controlled, object changing instructions to change, for each of the objects which are indicated in the control necessity information that the movement of which is controlled, at least one of the position and the direction of the object by an amount that is calculated based on the value of at least one of the parameters indicating physical quantity which is an attribute of the object, and control necessity information update instructions to update control necessity information to indicate that movements of all of the plurality of objects are not controlled under the condition that a value of the parameter set to each object satisfies predetermined conditions.

According to one embodiment of the present invention, there is provided an information processing system for controlling a movement of an object placed in a virtual space. The information processing system may include a control necessity information obtaining unit for obtaining control necessity information from a control necessity information storage unit which stores control necessity information indicative of whether or not the movement of each of a plurality of objects placed in the virtual space is controlled, an object changing unit for changing, for each of the objects which are indicated in the control necessity information that the movement of which is controlled, at least one of the position and the direction of the object by an amount that is calculated based on the value of at least one of the parameters indicating physical quantity which is an attribute of the object, and a control necessity information update unit for updating control necessity information to indicate that movements of all of the plurality of objects are not controlled under the condition that a value of the parameter set to each object satisfies predetermined conditions.

According to one embodiment of the present invention, there is provided an information processing method for controlling a movement of an object placed in a virtual space. The method may include: obtaining control necessity information from a control necessity information storage unit which stores control necessity information indicative of whether or not the movement of each of plurality of objects placed in the virtual space is controlled, changing, for each of the objects which are indicated in the control necessity information that the movement of which is controlled, at least one of the position and the direction of the object by an amount that is calculated based on the value of at least one of the parameters indicating physical quantity which is an attribute of the object, and updating control necessity information to indicate that movements of all of the plurality of objects are not controlled under the condition that a value of the parameter set to each object satisfies predetermined conditions.

If the physical simulation processing by the physics engine with respect to all of the objects placed in the virtual space is performed, the load on the information processing system is increased. In this regard, if the object that satisfies the predetermined conditions (for example, the object with the moving velocity equal to or less than the predetermined velocity) is displaced from the objects of the physical simulation processing, the processing load on the information processing system is assumed to be reduced.

With respect to an object composed of a plurality of connected elements, such as an object representing a chain, it is desirable to perform the physical simulation processing individually on each element so as to increase reality of movements of entire objects. However, for example, if some of the elements are displaced from the objects of the physical simulation processing while the rest of the elements are the objects of the physical simulation processing, expressions of movements of the objects may appear unnatural.

In one embodiment of the present invention, under the condition that the value of the parameter set at each of the objects satisfies the predetermined conditions, the control necessity information is updated so as to indicate that movements of all of the objects are not controlled. As such, it is possible to prevent the processing load on the information processing system from being increased, and in addition, avoid a situation where some of the elements are displaced from the objects of the physical simulation processing while the rest of the elements are the objects of the physical simulation processing. In this way, according to one embodiment of the present invention, it is possible to prevent the processing load on the information processing system from being increased while reducing the risk that the expressions of movements of the objects placed in the virtual space will appear unnatural.

Further, in one embodiment of the present invention, a control necessity information update instructions may include instructions to update the control necessity information so as to indicate that movements of all of the objects are not controlled under the condition that the value of the set parameter satisfies the predetermined conditions.

Further, in one embodiment of the present invention, the program may further include judging instructions to judge repeatedly at the predetermined timing whether or not the value of the parameter set at each object satisfies the predetermined conditions. In addition, the control necessity information update instructions may include instructions to update the control necessity information so as to indicate that movements of all of the objects are not controlled under the condition that it is determined that the number of the objects that satisfy the predetermined conditions continues to be the predetermined number or more for the predetermined number of times or more.

Further, in one embodiment of the present invention, the control necessity information update instructions may include instructions to update the control necessity information so as to indicate that movements of all of the objects are not controlled under the condition that the number of the objects that satisfy the predetermined conditions continues to be the predetermined number or more for a predetermined period of time.

Further, in one embodiment of the present invention, the control necessity information update instructions may include instructions to update the control necessity information so as to indicate that movements of all of the objects are not controlled under the condition that the number of the objects having the parameter value indicating at least one of the velocity and the angular velocity set at each object, the absolute value of which is equal to or less than the predetermined threshold value, is the predetermined number or more.

Further, in one embodiment of the present invention, the program may further include value update instructions to update the value of the parameter indicating the physical quantity of a collision object, which is the object to collide with other objects, such that amount of changes in at least one of the position and the direction of the collision object is smaller than the case where the value of the parameter is not updated, under the condition that the absolute value of the value indicating the relative velocity of the collision object with respect to another object is equal to or less than the predetermined threshold value of the values indicating the relative velocity.

Further, in one embodiment of the present invention, the value update instructions may include instructions to decrease the value of the parameter indicating the COR between the collision object and other objects.

Further, in one embodiment of the present invention, the control necessity information update instructions include instructions to update the control necessity information so as to indicate that movements of a plurality of objects, which are indicated in the control necessity information as being not controlled, are controlled, in response to the occurrence of the predetermined event.

Further, in one embodiment of the present invention, the program may further include image generation instructions to generate an image that represents the virtual space, in which the objects are placed, viewed from the viewpoint set in the virtual space.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A program stored in a non-transitory computer readable information storage medium, for causing a computer to function as an information processing system for controlling a movement of an object placed in a virtual space, the program including:
    object changing instructions to change at least one of a position and a direction of an object to be moved placed in the virtual space based on a value of a parameter associated with a physical quantity that is an attribute of the object to be moved;
    first change determination instructions to determine a first change in the physical quantity of the object to be moved, the first change corresponding to a user's operation;
    second change determination instructions to determine a second change in the physical quantity of the object to be moved, the second change corresponding to and different from the determined first change; and
    value changing instructions to change a value of the parameter based on the first change and the second change,
    wherein the object changing instructions include instructions to change, after the value of the parameter is changed, at least one of the position and the direction of the object to be moved based on the changed value of the parameter,
    wherein the first change determination instructions include instructions to determine changing a force applied to at least one of a plurality of elements included in the object to be moved, and
    wherein the second change determination instructions include instructions to determine changing a mass or a moment of inertia of at least one of the elements.

2. The program according to claim 1,
    wherein the first change determination instructions include instructions to determine a change in at least one of a velocity and an angular velocity of the object to be moved with respect to a specific direction,
    wherein the second change determination instructions include instructions to determine a change in at least one of a velocity and an angular velocity of the object to be moved with respect to a direction different from the specific direction.

3. The program according to claim 2, wherein
    under a condition that the first change determination instructions include instructions to determine increasing at least one of the velocity and the angular velocity of the object to be moved with respect to the specific direction, the second change determination instructions include instructions to determine decreasing at least one of the velocity and the angular velocity of the object to be moved with respect to the direction different from the specific direction.

4. The program according to claim 1, wherein
    the second change determination instructions include instructions to determine increasing at least one of the mass and the moment of inertia of at least one of the elements in which the change in the force is determined, and decreasing at least one of the mass and the moment of inertia of at least one of the rest of the elements.

5. The program according to claim 4, wherein
    the second change determination instructions include instructions to determine increasing at least one of the mass and the moment of inertia of at least one of the elements in which the change in the force is determined, and decrease at least one of the mass and the moment of inertia of all of the rest of the elements.

6. The program according to claim 4,
    wherein the object changing instructions include instructions to change at least one of the position and the direction of the object to be moved based on values of a plurality of parameters, each of the parameters being associated with at least one of a mass and a moment of inertia of each element, and
    wherein the value changing instructions include instructions to change a value of a parameter associated with at least one of a mass and a moment of inertia of an element in which an increase or a decrease in at least one of the mass and the moment of inertia is determined.

7. The program according to claim 1, wherein
the program further includes instructions to generate an image representing the virtual space, in which the object is placed, viewed from a viewpoint defined in the virtual space.

8. A non-transitory computer readable information storage medium storing a program for causing a computer to function as an information processing system for controlling a movement of an object placed in a virtual space, the program including:
   object changing instructions to change at least one of a position and a direction of an object to be moved placed in the virtual space based on a value of a parameter associated with a physical quantity that is an attribute of the object to be moved;
   first change determination instructions to determine a first change in the physical quantity of the object to be moved, the first change corresponding to a user's operation;
   second change determination instructions to determine a second change in the physical quantity of the object to be moved, the second change corresponding to and different from the determined first change; and
   value changing instructions to change a value of the parameter based on the first change and the second change,
   wherein the object changing instructions include instructions to change, after the value of the parameter is changed, at least one of the position and the direction of the object to be moved based on the changed value of the parameter,
   wherein the first change determination instructions include instructions to determine changing a force applied to at least one of a plurality of elements included in the object to be moved, and
   wherein the second change determination instructions include instructions to determine changing a mass or a moment of inertia of at least one of the elements.

9. An information processing system for controlling a movement of an object placed in a virtual space, comprising:
   an object changing unit for changing at least one of a position and a direction of an object to be moved placed in the virtual space based on a value of a parameter associated with a physical quantity that is an attribute of the object to be moved;
   a first change determination unit for determining a first change in the physical quantity of the object to be moved, the first change corresponding to a user's operation;
   a second change determination unit for determining a second change in the physical quantity of the object to be moved, the second change corresponding to and different from the determined first change; and
   a value changing unit for changing a value of the parameter based on the first change and the second change,
   wherein the object changing unit changes, after the value of the parameter is changed, at least one of the position and the direction of the object to be moved based on the changed value of the parameter,
   wherein the first change determination unit determines changing a force applied to at least one of a plurality of elements included in the object to be moved, and
   wherein the second change determination unit determines changing a mass or a moment of inertia of at least one of the elements.

10. An information processing method for controlling a movement of an object placed in a virtual space, the method comprising:
   changing at least one of a position and a direction of an object to be moved placed in the virtual space based on a value of a parameter associated with a physical quantity that is an attribute of the object to be moved;
   determining a first change in the physical quantity of the object to be moved, the first change corresponding to a user's operation;
   determining a second change in the physical quantity of the object to be moved, the second change corresponding to and different from the determined first change;
   changing a value of the parameter based on the first change and the second change; and
   changing, after the value of the parameter is changed, at least one of the position and the direction of the object to be moved based on the changed value of the parameter,
   wherein the first change changes a force applied to at least one of a plurality of elements included in the object to be moved, and
   wherein the second change changes a mass or a moment of inertia of at least one of the elements.

* * * * *